United States Patent Office 2,904,133
Patented Sept. 15, 1959

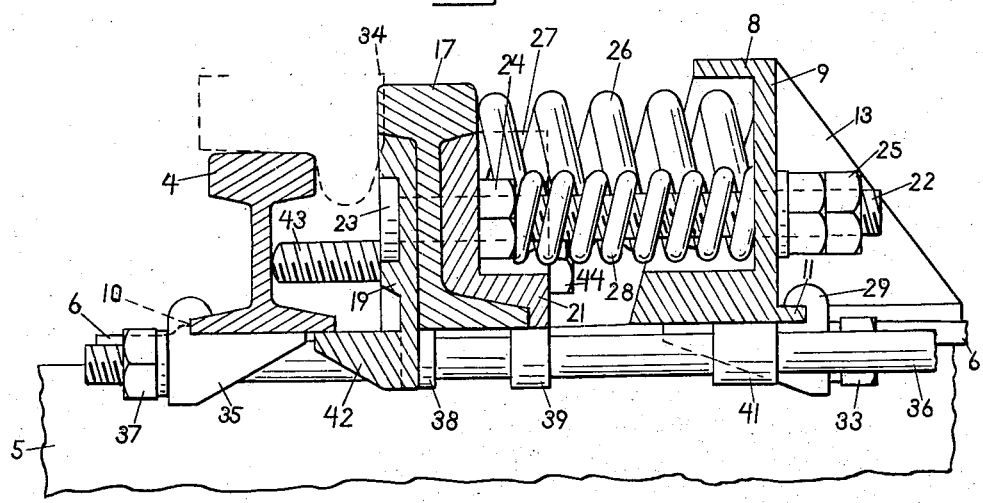
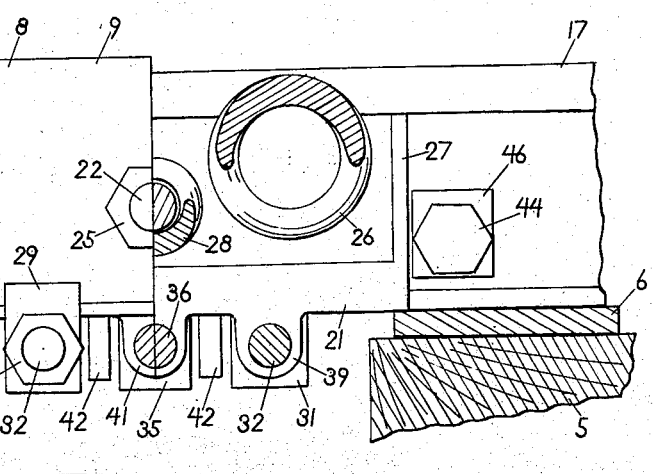

2,904,133

RAILWAY CAR RETARDER

John A. Bodkin, New York, N.Y., and Richard E. Bodkin, Westport, Conn.

Application October 29, 1956, Serial No. 618,956

5 Claims. (Cl. 188—62)

This invention relates to devices which are installed in a railway track in order to retard or to completely arrest the rolling movement of cars by pressing auxiliary rails against the car wheels so that the latter are braked by friction.

Objects of the braking are, for example, to prevent cars from rolling beyond the safe limit of the track, to replace a derailing mechanism used for this purpose and thereby to avoid the laborous repositioning of derailed cars, to mitigate the coupling impact of cars or their impact with a fixed bumper or other track installation, thereby to avoid damage of cars, cargo and installations, to increase the resistance of a car against the propulsion, for example by a locomotive, and thereby to operate as a warning signal.

These objects must be achieved while the braked car runs within the relatively short stretch equipped with the retarder, and that is possible only if the braking pressure against the car wheels is very strong. We have found that previously suggested car-retarders failed to provide a sufficiently strong pressure because the pressure applied to the wheel-braking rails counteracted against rods and these elements are not strong enough to withstand a sufficiently high pressure without breaking or bending. Hence, a specific object of our invention is to avoid rods transmitting braking pressure by compression stress and to provide a sturdy, stationarily secured structure receiving the counteraction of the braking pressure immediately.

Other objects are to make possible the arrangement of a plurality of springs of heavy coiled wire combining great strength with sufficient resiliency, to place these springs in immediate contact with the stationary structure by providing the latter with elongated parts, to incorporate each of these parts in a robust bracket, to provide this bracket with foot plates adapted to be affixed to ties of the track, to connect the foot plates by these elongated parts so that the latter extend over the space beween the ties, and thereby make substantially the entire distance between the ties available for the arrangement of springs.

Further objects are to make the brackets higher than the run rails of the track, thereby to make possible to receive the braking pressure at the same level at which the lower parts of rims of the car wheels are, and also thereby to provide space in vertical direction for large and strong springs, to brake the rims of co-axial wheels of a car simultaneously, to transfer the braking pressure to the brackets along a horizontal line substantially at the same level, and thereby to avoid transmission elements which might be bent or overburdened by vertical leverage of this pressure.

Still other objects are to provide brake rails at variable distances from the brackets so that the springs press these brake rails against the rims of car wheels running on the track rails, to limit the movement of these brake rails in the direction of this pressure, and to guide the brake rails accurately relatively to the brackets in the direction of this variable distance.

Still further objects are to support the brake rails slidably on slide plates affixed to the ties, to support the brackets by the same plates, to secure the brackets in adjustable positions, and to provide spacing means for adjusting the distance between brake rails and run rails accurately as best suitable.

Still other objects are to provide the brake rails with reinforcing fittings, to affix these fittings to the brake rails by the same means which limit their movement, to guide the brake rails by rods passing through lower projections of these fittings, to secure the positions of these bolts by jaw members gripping the run rails from outside and the brackets from inside of the track, and thereby to secure the brackets additionally against shift by the braking pressure.

Still further objects are to secure the correct gauge of the track by holding its run rails against braking pressure which may be transferred through the wheel rims to the run rails, to grip, for this purpose the outsides of the run rails with jaw members, to connect these members by rods extending through the brackets and beyond the outsides of the run rails, and to use these rods as additional means for guiding the brake rails.

Still other objects are to attain the mentioned results with means that can be easily installed in a normal railway track without drilling through the run rails or making any other permanent alteration of the track, with means that can be removed from one spot of the track and transferred to another spot, and that permit adjustment between slight retarding and complete stoppage.

Still other objects and advantages will appear from the following description of an exemplifying embodiment of our invention, from the appended claims and from the accompanying drawing in which:

Fig. 2 shows a cross-section taken along the line 2—2 in Fig. 1.

Fig. 3 shows a cross-section taken along the broken line 3—3 in Fig. 1.

Figs. 2 and 3 are represented on a larger scale than Fig. 1.

Figure 1:
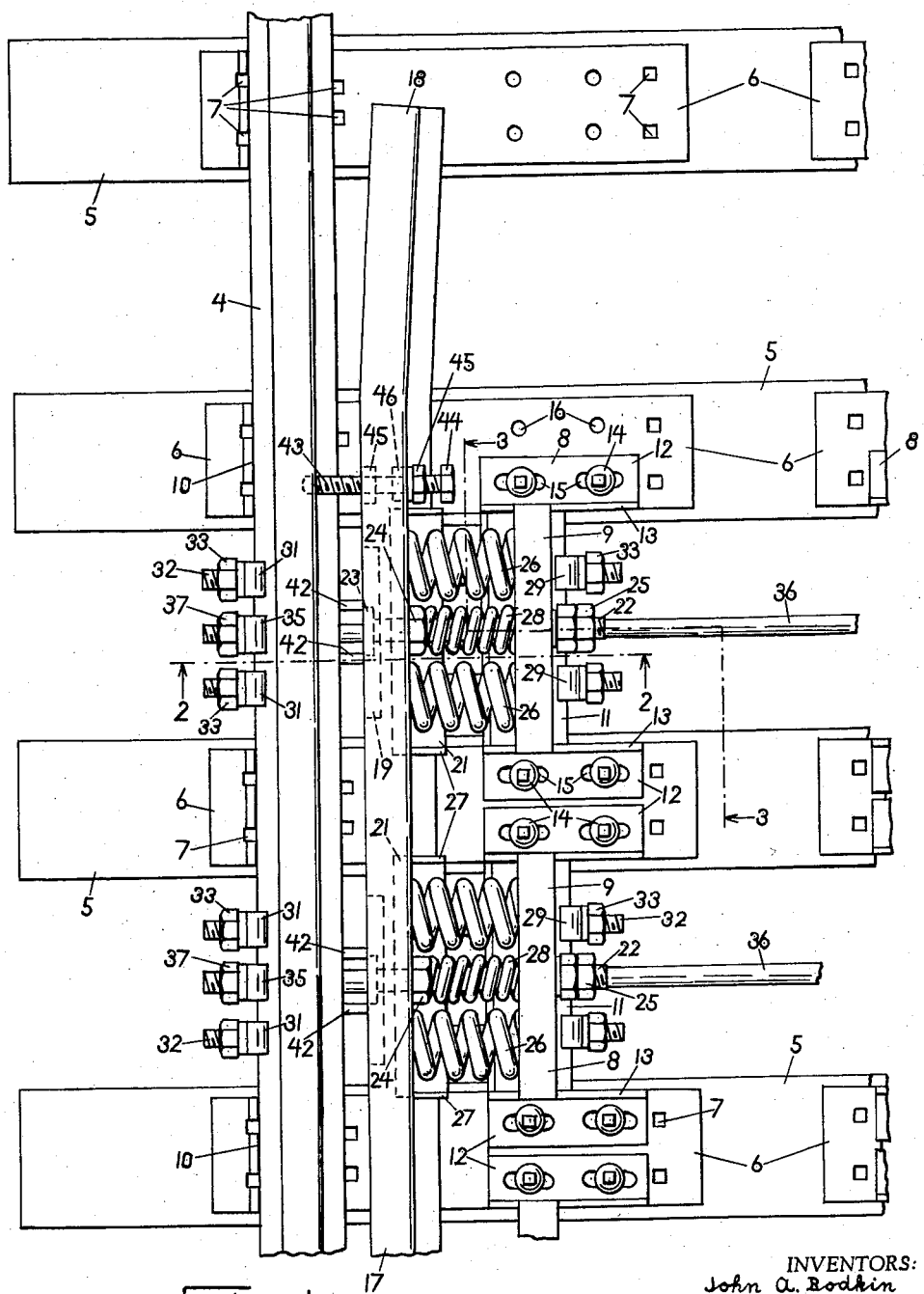
Fig. 1 shows a top view of a broken off portion of an illustrative embodiment of our invention installed in a railway track.

Referring to the drawing, numeral 4 indicates the left rail of a normal railway track which has wooden ties 5 underlying and crossing its rails. Two plates 6 overlie each of the ties 5 and extends symmetrically, one to the left and the other to the right, from lines near the center of the track in the direction of the tie to lines positioned outside of the track rails. The plates 6 are affixed to the ties in known manner, for example, by spikes passing through holes 7 of the plates 6. Each plate may have a shoulder 10 contacting the outside of the foot of a rail 4.

A number of brackets 8 are arranged within the track. Each of these brackets has an elongated part 9 extending in the direction of the track over the space between two neighboring ties and being recessed at the side opposite to the track center whereby the bracket forms a housing for the ends of springs which will be described later. Each bracket further has a ledge 11 extending from the bottom of the part 9 toward the center of the track, two foot plates 12 extending to both sides horizontally, and vertical walls 13 reinforcing the connection of the parts 9, 11 and 12.

The brackets 8 are arranged in pairs, each pair comprising two brackets extending between the same neighboring ties at opposite sides from the track center line. The foot plates 12 of these brackets overlie the slide plates 6 positioned on these ties and are affixed to the ties and to the plates 6 by screw spikes 14 which pass through slots 15 of the foot plates and holes 16 of the slide plates. The slots 15 permit adjustment of the position of the brackets when the screw spikes 14 are temporarily loosened.

There may be several pairs of brackets 8, for example four pairs which are arranged symmetrically with respect to the longitudinal center line of the lowermost tie in Fig. 1. The brackets form a left and a right row, each row comprising one bracket of each pair.

Two auxiliary or brake rails 17 extend near the insides of the run rails 4, one between the left rail 4 and the left row of brackets and one (not shown) between the right run rail and the right row of brackets. These brake rails are longer than the rows of brackets, overlie the slide plates 6 slidably and have a variable distance from the brackets. The ends 18 of the brake rails are preferably bent inward in order to facilitate the entrance of car wheels into the space between run rails and brake rails.

Each brake rail 17 may be made of a standard guard rail of which the foot is cut off at one side and to which fittings 19 and 21 are affixed in any suitable manner, for example by screw bolts 22 passing through fittings and brake rail, having heads 23 positioned in recesses of the outer fittings 19 and being tightened by nuts 24 contacting the inner fittings 21. The same bolts extend preferably farther through the nearest bracket 8 and are provided with nuts 25 near their free ends whereby the outward movability of the brake rails is limited, its utmost outer position or its largest distance from the bracket being determined by the positions of the nuts 25.

Strong springs are positioned between the brackets and the brake rails. For example, two coiled springs 26 of thick wires and large diameters are positioned between each bracket and the nearest brake rail, have inner ends reaching into the recess of the bracket part 9 into immediate contact with the bracket, and have outer ends contacting the brake rail 17 and its fitting 21. This fitting may have lateral walls 27 whereby also the fitting 21 forms a recess receiving spring ends. There may be somewhat smaller further springs similarly located between bracket and brake rail within or beside the springs 26. For example a spring 28 surrounds each bolt 22.

The springs 26 and 28 exert a pressure which tends to move the brake rails outward as far as the bolts 22 permit. The brackets 8 are secured against dislocation by the spring pressure by their previously described connection with the ties and additionally by clamping devices which comprise jaw members 29 gripping the ledges 11 of the brackets, jaw members 31 gripping the outside of the feet of the run rails 4, bolts 32 passing through bores of the members 29 and 31 and nuts 33 screwed on the ends of the bolts 32 and holding the jaw members in gripping positions.

When the car wheels enter the space between the run rails and brake rails, they crowd the brake rails and force them to slide inwardly toward the center of the track against the pressure of the springs. The resulting spring pressure of each set of springs on both sides of the track is exerted against the adjacent bracket part 9, thence through bolt 32 by tension stress to the adjacent running rail which in turn is held firm by the car wheel with the weight of the car thereon.

In Fig. 2, a portion of the outline of such a wheel is indicated in dotted lines at 34. The distance between two co-axial car wheels is a little smaller than the largest distance of the brake rail surfaces which contact the wheels. Hence, the wheels urge the brake rails toward the center of the track against the pressure of the springs. The wheels themselves are held against the braking pressure mainly by the wheel axle, but some of this pressure may be transferred to the run rails 4 by occasional contact between the wheel and running rails. The latter are held stationary by their known connection with the ties. However, we prefer to secure the run rails additionally against outward dislocation or bending out of track gauge by clamping devices. The latter devices comprise jaw members 35 being similar to the members 31 and gripping the outsides of the feet of both run rails, long rods 36 extending through the members 35 and across the track underneath all four running rails and brake rails and nuts 37 holding the members 35 in gripping position. The rods 36 hold the opposed brackets of each pair in alignment, hold the two running rails in track gauge to each other, and unite left and right side of the car-retarder.

Each fitting 19 has three downward extending projections or eyes 38. Each fitting 21 has three downward projecting eyes 39, each co-axial with one of the eyes 38, and each bracket 8 has three downward projecting eyes 41, each co-axial with one of the eyes 38 or 39. The rod 36 slidably passes through one set of co-axial eyes 38, 39 and 41 whereby this rod is disposed in a position crossing the track rectangularly. Bolts 32 pass through each of the two other sets of co-axial eyes whereby also the correct angular position of the latter bolts is obtained. The thus positioned bolts 32 and rods 36 provide additional guidance for the brake rail 17.

Each fitting 19 may be further provided with outward projections or lugs 42 which extend into guiding contact with the bottom surface of the run rail 4 and help to maintain the brake rail in correct vertical position.

In order to make possible an accurate positioning of the brake rail at the desired distance from the run rails, spacing devices are provided. Preferably, one spacing device is arranged near each end of each brake rail and comprises a bolt 43 passing through a hole of the brake rail and having a head 44 on its inner end, and two nuts 45 allowing to affix the bolt 43 to the brake rail in the position in which the bolt contacts the run rail when the brake rail is correctly spaced from the run rail. A small, perforated fitting 46 may be positioned between the inner nut 45 and the brake rail.

The described car-retarder allows changes in the braking friction within a wide range and with fine accuracy. Such changes are preferably made in the following manner:

The screw spikes 14 are loosened. The distance of the brake rails from the run rails is adjusted by means of the spacing devices 43, 44, 45. The compression of the springs or the distances between the brackets and the brake rails are adjusted by means of the nuts on the bolts 22 and 32, and the screw spikes are fastened again.

We desire it understood that our invention is not confined to the particular embodiment shown and described, the same being merely illustrative, and that our invention may be carried out in other ways within the scope of the appended claims without departing from the spirit of our invention as it is obvious that the particular embodiment shown and described is only one of the many that may be employed to attain the objects of our invention.

Having described the nature of our invention, what we claim and desire to protect by Letters Patent is:

1. A car-retarder for a railway track having ties and a pair of run rails, said retarder comprising slide plates permanently affixed on neighboring ties between the run rails, two brackets each having foot plates overlying said slide plates and each having holes, spikes passing through said holes and said slide plates to secure each of said brackets to said ties within the pair of run rails, said brackets having elongated parts extending in secured position parallel to said run rails, a pair of brake rails each overlying and slidably resting on said slide plates within the pair of run rails, one rail of the pair of brake rails extending parallel to an elongated bracket part between the bracket part and its adjacent run rail, and the other rail of the pair of brake rails extending parallel to the other elongated bracket part between said other bracket part and the other run rail, spring means engaging each brake rail and its adjacent bracket part to yieldably urge the brake rail to slide toward its adjacent run rail, connecting means between each bracket and its adjacent brake rail to limit the movement of the brake rail toward its adjacent run rail from the bracket, and a bolt attached by an adjustable nut to each bracket at the foot thereof, each of said bolts running underneath the brake rail adjacent to the bracket and underneath the adjacent run rail and terminating in a jaw member to grip the edge of the adjacent run rail most removed from the center line of the track to transmit braking stress from said bracket to its adjacent run rail independent of braking stress transmitted by the other bolt from the other brake rail to the other run rail.

2. The subject matter of claim 1 characterized by the fact that the holes in the footplates are slots, the spikes pass through said slots and said slide plates to secure each of said brackets to said ties in independently adjustable positions within the pair of run rails, and the said connecting means between each bracket and its adjacent brake rail is adjustable to limit the movement of the brake rail toward its adjacent run rail at variable distances from the bracket.

3. The subject matter of claim 2 characterized by the fact that a spacing bolt is adjustably mounted in each brake rail protruding toward the adjacent running rail to engage said running rail to further limit the movement of the brake rail toward the running rail from the bracket.

4. The subject matter of claim 3 characterized by the fact that the bracket parts and the springs and the brake rails extend higher than the run rails.

5. The subject matter of claim 4 characterized by the fact that a rod is provided running underneath both brake rails and both run rails perpendicular thereto terminating in a jaw member at each of its free ends, the jaw members gripping the edges of the run rails most removed from the center line of the track to resist out of gauge movement of the run rails away from the center line of the track.

References Cited in the file of this patent

UNITED STATES PATENTS

| | | |
|---|---|---|
| 265,754 | Chandler | Oct. 10, 1882 |
| 999,531 | Taylor | Aug. 1, 1911 |
| 1,626,941 | Lewis | May 3, 1927 |
| 1,647,575 | Nelson | Nov. 1, 1927 |
| 2,104,185 | Clausen | Jan. 4, 1938 |
| 2,452,720 | Bodkin | Nov. 2, 1948 |

FOREIGN PATENTS

| | | |
|---|---|---|
| 500,520 | Belgium | Jan. 31, 1951 |
| 29,904 | Great Britain | Dec. 30, 1912 |